United States Patent
Bodas et al.

(10) Patent No.: US 8,068,879 B2
(45) Date of Patent: Nov. 29, 2011

(54) DISPLAYING A MESSAGE ON A PERSONAL COMMUNICATION DEVICE

(75) Inventors: Rohit S. Bodas, Vernon Hills, IL (US); Jay D. O'Connor, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 461 days.

(21) Appl. No.: 12/331,774

(22) Filed: Dec. 10, 2008

(65) Prior Publication Data
US 2010/0144319 A1    Jun. 10, 2010

(51) Int. Cl.
*H04M 1/00*    (2006.01)
*H04B 1/38*    (2006.01)

(52) U.S. Cl. .................. 455/566; 455/557; 455/517

(58) Field of Classification Search .............. 455/566, 455/517, 557, 575.1, 414.1
See application file for complete search history.

(56) References Cited

U.S. PATENT DOCUMENTS

| | | | |
|---|---|---|---|
| 6,405,049 B2 * | 6/2002 | Herrod et al. | 455/517 |
| 6,895,387 B1 | 5/2005 | Roberts et al. | |
| 7,218,956 B2 | 5/2007 | Okawa | |
| 2004/0073687 A1 * | 4/2004 | Murata | 709/229 |
| 2005/0188406 A1 | 8/2005 | Gielow et al. | |
| 2005/0239495 A1 | 10/2005 | Bayne | |
| 2007/0159522 A1 | 7/2007 | Neven | |
| 2007/0264987 A1 | 11/2007 | Gupta et al. | |
| 2008/0139246 A1 * | 6/2008 | Michinaka | 455/557 |
| 2009/0097712 A1 | 4/2009 | Harris | |

FOREIGN PATENT DOCUMENTS

| | | |
|---|---|---|
| JP | 2003-087420 A | 3/2003 |
| WO | 2007-109541 A2 | 9/2007 |

OTHER PUBLICATIONS

Ji Eun Park, "Corresponding Application PCT/US2009/064766—PCT International Search Report and Written Opinion," WIPO, ISA/KR, Korean Intellectual Property Office, Daejeon, Republic of Korea, May 13, 2010, 11 pages, most relevant pp. 1, 6-7 and 10-11.

* cited by examiner

*Primary Examiner* — Jean Jeanglaude

(57) ABSTRACT

Hardware not currently being used is re-oriented to a new purpose. Sensors on a personal communication device monitor the environment around the device. Based on an analysis of that monitoring, an appropriate visual message is shown on an outside display screen of the device. The visual message is targeted toward those around the device rather than to the device's user. In some embodiments, the monitoring devices include a camera and a microphone. Images taken by the camera are analyzed in an attempt to detect persons or objects around the user or to determine where the user is located. Captured speech is analyzed to determine topics of conversation. The results of these analyses are fed into a decision-making process that determines what visual messages would be appropriate. In one embodiment, the visual message is an advertisement.

21 Claims, 4 Drawing Sheets

DISPLAYING A MESSAGE ON A PERSONAL COMMUNICATION DEVICE

FIELD OF THE INVENTION

The present invention is related generally to displaying messages on computer screens and, more particularly, to choosing messages to display based on environmental factors.

BACKGROUND OF THE INVENTION

A trend in personal communication devices (e.g., cellular telephones and personal digital assistants) is to make the devices more capable by adding more hardware. Cameras are common on these devices, as are multiple display screens. GPS receivers are becoming more common. Other devices for monitoring either the environment around the device (e.g., a thermometer) or for monitoring the user of the device (e.g., a heartbeat detector) have been proposed.

Useful as this additional hardware can be in particular situations, much of it is used only rarely. The cost of the hardware is paid for (directly or indirectly) by the user, but the hardware provides only a very limited return on that cost. Ready to perform, this hardware spends most of the time taking up space in the device, adding weight, cost, and operational complexity, and only occasionally providing a service to the device's user.

BRIEF SUMMARY

The above considerations, and others, are addressed by the present invention, which can be understood by referring to the specification, drawings, and claims. According to aspects of the present invention, hardware that is not currently being used is re-oriented to a new purpose. Sensors on a personal communication device monitor the environment around the device. Based on an analysis of that monitoring, an appropriate visual message is shown on a display screen of the device. The visual message is targeted toward those around the device rather than to the device's user.

In some embodiments, the monitoring devices include a camera and a microphone. Images taken by the camera are analyzed in an attempt to detect persons or objects around the user or to determine where the user is located. Captured speech is analyzed to determine topics of conversation. The results of these analyses are fed into a decision-making process that determines what visual messages would be appropriate.

In one embodiment, the visual message is an advertisement. Based on the monitoring, an advertisement is chosen and displayed. The device's owner may receive some compensation from the advertiser for allowing his device to display advertisements. While not expected to be very significant, the compensation can offset the cost of the hardware that, in the past, went unused for long periods of time.

Some embodiments are directed toward "clamshell" cellular telephones. Most of these devices include a display on the "outside," visible when the telephone is in the closed position, and another display on the "inside," visible to the user when the user opens the telephone to make a call. Detecting that the device is open and in use (and therefore that the outside display is pointed away from the user and toward people around him, if any), visual messages are displayed on the outside display.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
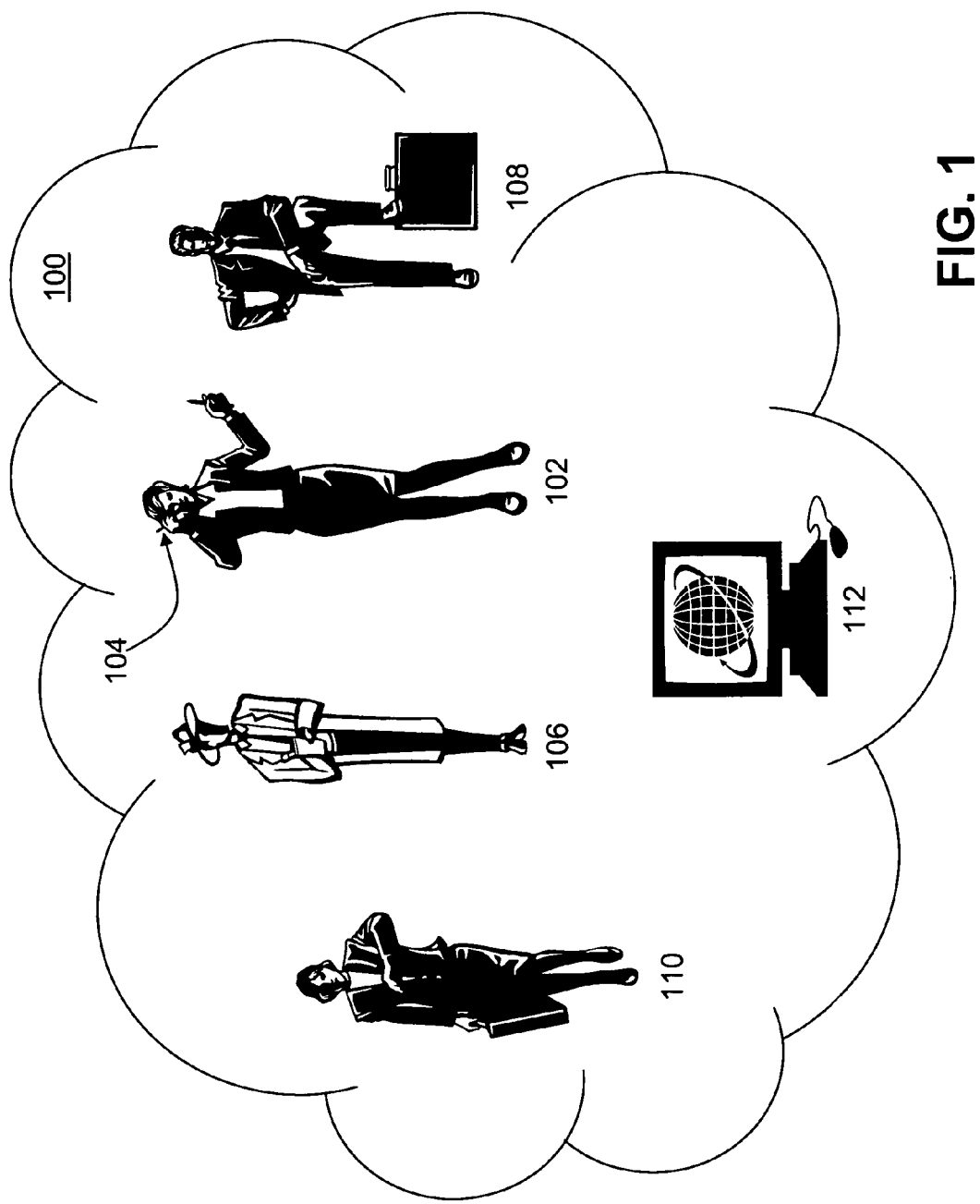
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, a person 102 is communicating via her personal communication device 104. While in use, the "outside" of the device 104 faces away from the user 102. (In this discussion, the "inside" of the device 104 is defined to be the side closest to the user 102 when she is using the device 104 to communicate. The "outside" of the device 104 is the side facing away from the user 102.) The device 104 of the user 102 is in a communications environment 100 (e.g., the device 104 has access to a cellular telephone network) that allows the device 104 to access other devices, in particular, the message server 112.

According to aspects of the present invention, the personal communication device 104 can display visual messages on its outside face. The visual messages may, for example, be sent to the device 104 from the message server 112, or the visual messages may be stored or generated locally on the device 104.

The visual messages presented by the personal communication device 104 are not intended to be seen by the user 102 of the device 104. Instead, they are intended to be seen by other people in the near vicinity of the device 104. In FIG. 1, some people, e.g., the person 106, are positioned so that they can see the visual messages displayed on the outside of the device 104. Other people, e.g., the person 108, are not in a position to see the visual messages. Some people, e.g., the person 110, are in a position where they could see the visual messages, but they are busy in their own tasks and so are not looking at the device 104.

Figure 2C:
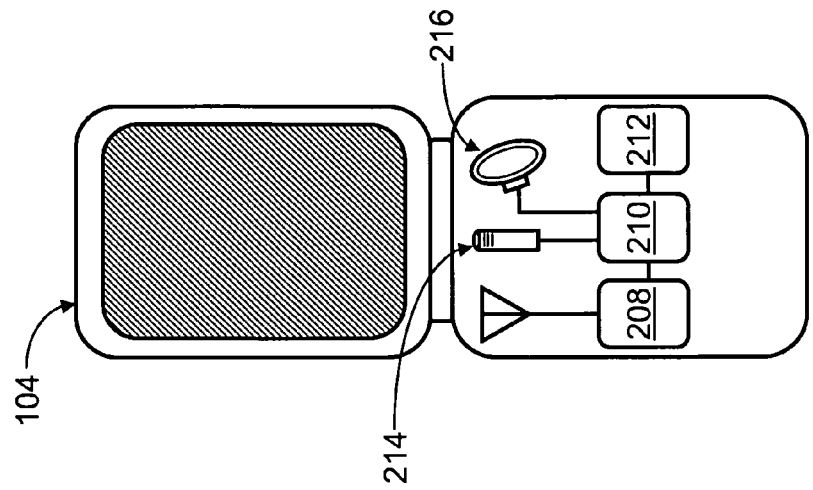
FIGS. 2a, 2b, and 2c are simplified schematics of a personal communication device that displays visual messages on its outer surface.
Figure 2B:
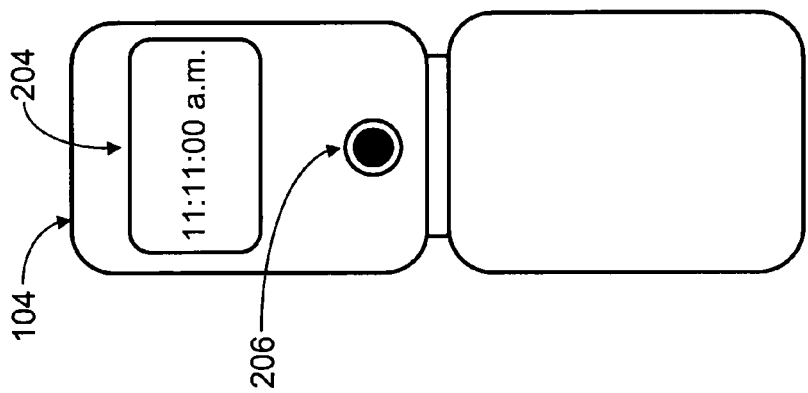
Figure 2A:
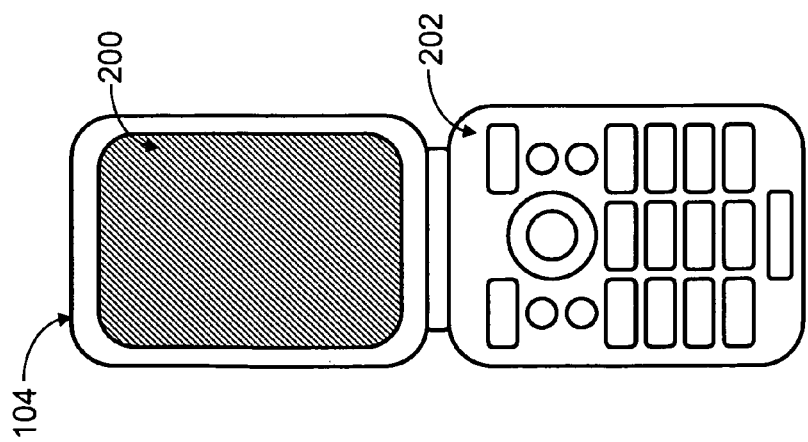

FIGS. 2a, 2b, and 2c show a personal communication device 104 (e.g., a cellular telephone, personal digital assistant, or personal computer) that incorporates an embodiment of the present invention. FIGS. 2a and 2c show the device 104 in an open configuration, presenting its main display screen 200 to the user 102. Typically, the main display 200 is used for most high-fidelity interactions with the user. For example, the main display 200 is used to show video or still images, is part of a user interface for changing configuration settings, and is used for viewing call logs and contact lists. To support these interactions, the main display 200 is of high resolution and is as large as can be comfortably accommodated in the device 104. The typical user interface of the device 104 includes, in addition to the main display 200, a keypad 202 or other user-input devices.

FIG. 2b shows the other or "outside" face of the personal communication device 104. This is the side that generally faces away from the user 102 when she is using the device 104 to communicate. On this side, the device 104 includes a second display screen 204, usually smaller than the main display screen 200. Many devices 104 include a camera 206 on this outside face.

FIG. 2c illustrates some of the more important internal components of the personal communication device 104. The device 104 includes a communications transceiver 208, a processor 210, and a memory 212. A microphone 214 (or two) and a speaker 216 are usually present.

Figure 3:
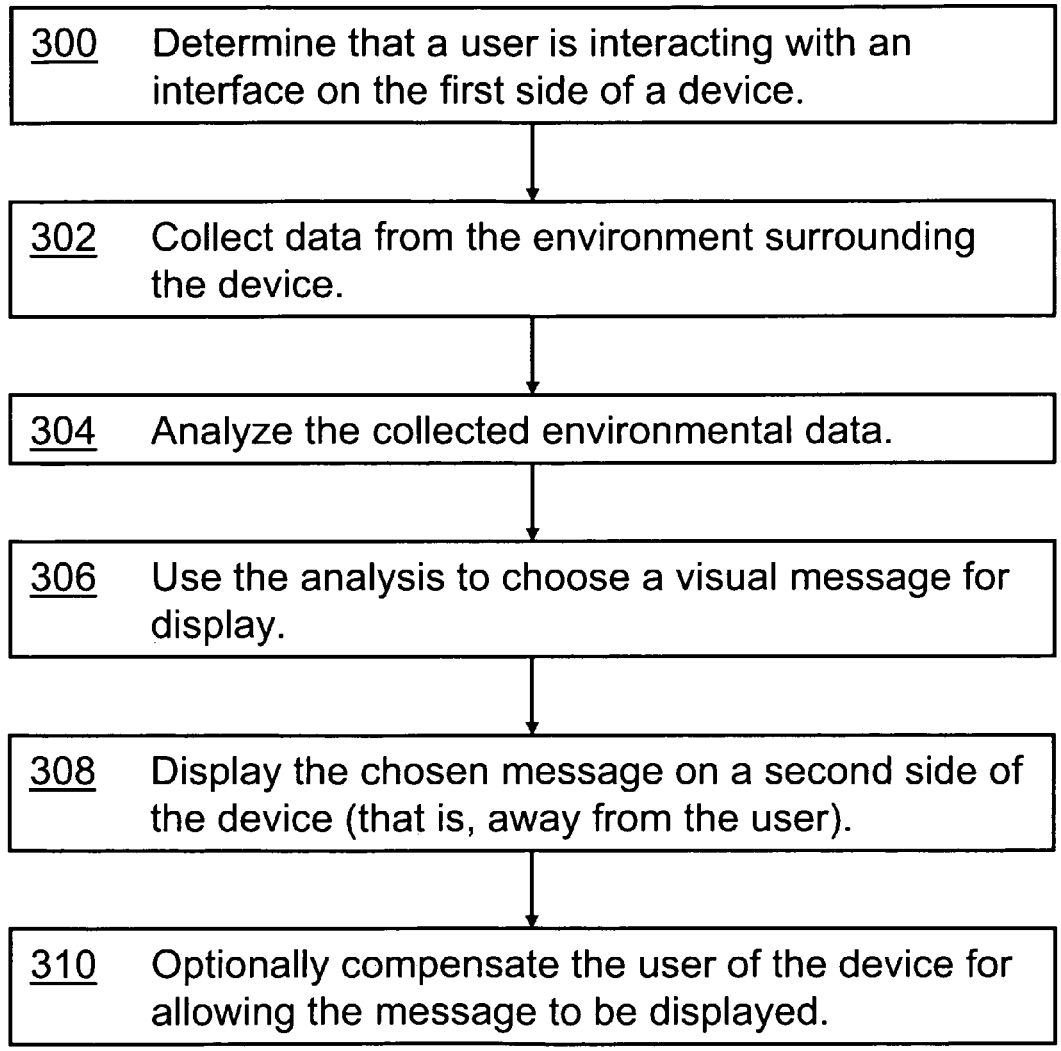
FIG. 3 is a flowchart of an exemplary method for analyzing an environment around a device and for displaying a visual message appropriate to that environment.
Figure 4:
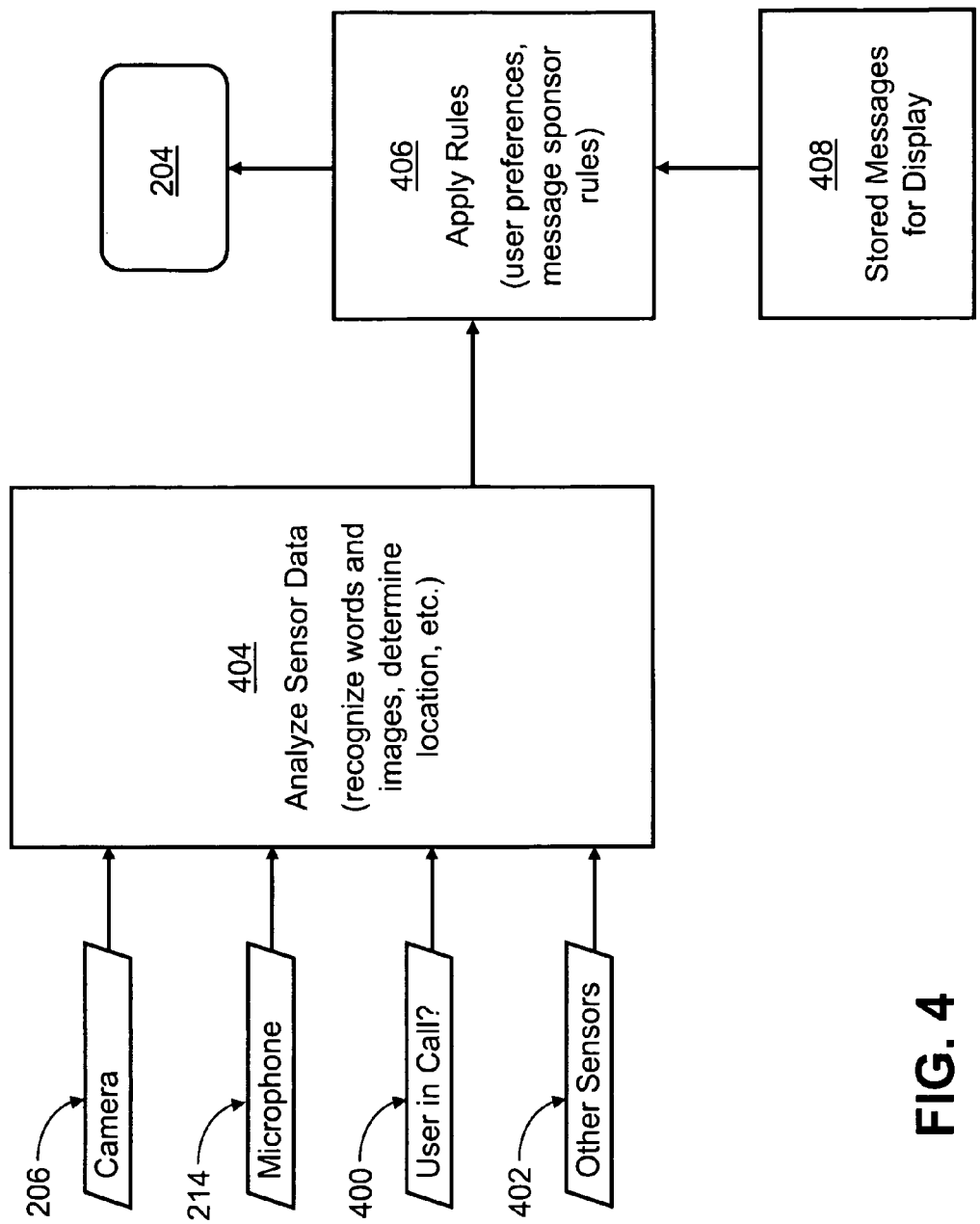
FIG. 4 is a dataflow diagram showing how visual messages can be supplied to a device.

FIG. 3 presents one method for displaying visual messages on the screen 204 on the outside face of the personal communication device 104, according to aspects of the present invention. FIG. 4 shows how data flow through a system embodying aspects of the present invention. In the following discussion, these two figures are considered together.

The method of FIG. 3 begins in step 300. The method wishes to determine whether the outside screen 204 of the personal communication device 104 is facing toward other people in the near vicinity of the user 102. Because this cannot be directly determined, as a substitute step 300 determines that the user 102 of the device 104 is interacting with the inside face of the device 104. For example, where the device 104 is a clamshell cellular telephone as illustrated in FIGS. 2a, 2b, and 2c, this can mean that the user 102 has opened the device 104 and is making a call. By determining this, the system of the present invention can reasonably assume that the outside screen 204 of the device 104 is facing away from the user 102 and is thus in a favorable position for displaying visual messages to people in the near vicinity of the user 102.

There are several ways of knowing that the user 102 is interacting with the inside face of the personal communication device 104. Possibly the best detection method involves determining that the user 102 is actually in a call using the device 104 without the assistance of an external microphone or speaker (e.g., a wired or wireless headset) (400 in FIG. 4). In this case, the user 102 is almost certainly holding the device 104 in a manner that positions its outside screen 204 toward other people. A simpler embodiment may react whenever the user 102 opens the device 104 or interacts with the user interface 202 on the inside face of the device 104. While this detection method is not ideal (when interacting with the user interface 202, the outside screen 204 of the device 104 may be facing down rather than toward other people), it can work especially when accompanied by a timer. For example, the visual messages are displayed (step 308 of FIG. 3, discussed below) for five minutes after the most recent interaction with the user interface 202. During the period of the timer, the user 102 will probably move the device 104 into a position where its outside screen 204 is directed toward other people.

In step 302, the personal communication device 104 attempts to collect data from the environment surrounding the device 104. This collection process can begin after step 300 determines that a favorable opportunity exists, or it may go on continually. In any case, the collected data may include sounds collected by the microphone 214 or images collected by the camera 206. (Note that some devices 104 include two microphones 214 in order to cancel out background noise. In some embodiments of the present invention, one microphone 214 is dedicated to the user 102, while the other microphone 214 is used to collect environmental data.) Some devices 104 have other sensors (402 in FIG. 4) that can be used. For example, a GPS sensor can tell the location of the device, a clock can tell the time of day, or a light sensor (possibly tied to the camera 206) can sense ambient lighting.

In step 304, the collected environmental data are analyzed (404 in FIG. 4). Images from the camera 206 may indicate the number of people surrounding the user 102 of the personal communication device 104. Specific faces, landmarks, or printed words may be recognized. The GPS location of the device 104 can be correlated with a map to know the venue in which the user 102 is located. Keywords can be extracted from conversations overheard.

The analysis of step 304 is used in step 306 to choose an appropriate visual message to display on the outside screen 204 of the personal communication device 104. For example, the analysis may reveal that the user 102 is in an arena at a sporting event. The appropriate visual messages can then be advertising messages related to that event or to the teams participating in the event. If keywords extracted from overheard conversations indicate that dinner choices are being discussed, that information can be combined with a location determination to select advertisements for local restaurants.

Other inputs can be made to the selection of appropriate visual messages (406 in FIG. 4). For example, the preferences of the user 102 can be considered, and messages deemed offensive by the user 102 can be selected against. A sponsor of visual messages can also impose preferences. For example, a restaurant sponsor may not wish to display advertising at times when the restaurant is closed.

The sensor data, preferences, and other rules are applied to choose one or more appropriate visual messages for display. The selection process of step 306 can occur locally on the personal communication device 104, remotely on the message server 112, or on a combination of the two.

The chosen visual message is retrieved either from the personal communication device 104 itself or from the remote message server 112 and is displayed on the outside screen 204 of the device 104 (step 308 of FIG. 3). Because the outside screen 204 is usually quite small, many visual messages are expected to be simple logos or other images easily interpreted by people at a distance of a few feet from the outside screen 204. The process of collecting data, analyzing, choosing, and displaying a visual message can cycle as long as the device 104 is determined to be in a favorable position for displaying visual messages.

Step 310 is optional but potentially important. For visual messages that are advertisements, the message sponsor can compensate the user 102 for displaying the messages. This compensation is meant to induce the user 102 to agree to display the advertisements, subject, of course, to the stated preferences of the user 102. In a simple system, the user 102 is compensated for each visual message displayed. A more sophisticated system can analyze (possibly using the same sensors discussed above in reference to step 302) the environment of the personal communication device 104 at the time when each visual message is displayed. The compensation is then varied depending upon those circumstances. For example, a visual message displayed when many people are in the vicinity of the user 102 may be worth more to the message sponsor than the same visual message displayed when few people are around.

The methods of the present invention therefore allow a message sponsor to reach a small, but potentially relevant, audience. Compensation arrangements can benefit the user 102 for allowing the message sponsor to use the small message "billboard" of her outside screen 204 that would otherwise be unused while the user 102 is making a call.

In view of the many possible embodiments to which the principles of the present invention may be applied, it should be recognized that the embodiments described herein with respect to the drawing figures are meant to be illustrative only and should not be taken as limiting the scope of the invention. For example, messages other than advertisements, e.g., public service notices, can be displayed. Other arrangements for compensation are possible and may be called for in various environments. Therefore, the invention as described herein contemplates all such embodiments as may come within the scope of the following claims and equivalents thereof.

We claim:

1. A method for displaying a message on a personal communication device, the device comprising a first side and a second side opposite the first side, the method comprising:
   determining that a user is interacting with a user interface on the first side of the device;
   collecting data from an environment around the device, the data collected by an element selected from the group consisting of: a camera on the device and a microphone on the device;
   analyzing at least some of the collected data;
   based, at least in part, on a result of the analyzing, choosing a visual message; and
   on a display on the second side of the device, displaying the chosen message.

2. The method of claim 1 wherein determining that a user is interacting with a user interface comprises detecting an element selected from the group consisting of: an opening of the device to reveal the first side, a telephone conversation mediated by the device, an Internet interaction mediated by the device, an entry made by the user on the user interface, and a media presentation on the user interface.

3. The method of claim 1 wherein collecting data from an environment further comprises collecting data by an element selected from the group consisting of: a temperature sensor, a lighting sensor, and a location sensor.

4. The method of claim 1 wherein analyzing at least some of the collected data comprises analyzing collected speech for keywords.

5. The method of claim 1 wherein analyzing at least some of the collected data comprises analyzing collected image data in an attempt to recognize an element selected from the group consisting of: a person, a landmark, a printed name, and an image.

6. The method of claim 1 wherein analyzing at least some of the collected data comprises analyzing collected image data in an attempt to determine a venue of the device.

7. The method of claim 1 wherein choosing a visual message comprises applying rules to the analyzed data.

8. The method of claim 7 wherein applying rules comprises analyzing preferences of the user of the device or of a supplier of the chosen message.

9. The method of claim 1 wherein choosing a visual message is performed by a server remote from the device or on the device itself.

10. The method of claim 1 wherein choosing a visual message is performed by the device.

11. The method of claim 1 further comprising:
    recording circumstances of displaying the chosen message; and
    compensating the user of the device, the compensating based, at least in part, on the recorded circumstances.

12. The method of claim 1 further comprising:
    repeating the collecting, analyzing, choosing, and displaying until determining that the user is no longer interacting with the user interface on the first side of the device.

13. A personal communication device comprising:
    a user interface on a first side of the device;
    a display on a second side of the device, the second side opposite the first side; and
    a processor configured to:
        determine that a user is interacting with the user interface on the first side of the device;
        collect data from an environment around the device, the data collected by an element selected from the group consisting of: a camera on the device and a microphone on the device;
        analyze at least some of the collected data; and
        on the display on the second side of the device, display a message;
    wherein the processor is further configured to choose, based, at least in part, on a result of the analyzing, a visual message to display.

14. The personal communication device of claim 13 wherein determining that a user is interacting with a user interface comprises detecting an element selected from the group consisting of: an opening of the device to reveal the first side, a telephone conversation mediated by the device, an Internet interaction mediated by the device, an entry made by the user on the user interface, and a media presentation on the user interface.

15. The personal communication device of claim 13 wherein the processor is further configured to collect data from an element selected from the group consisting of: a temperature sensor, a lighting sensor, and a location sensor.

16. The personal communication device of claim 13 wherein analyzing at least some of the collected data comprises analyzing collected speech for keywords.

17. The personal communication device of claim 13 wherein analyzing at least some of the collected data comprises analyzing collected image data in an attempt to recognize an element selected from the group consisting of: a person, a landmark, a printed name, and an image.

18. The personal communication device of claim 13 wherein analyzing at least some of the collected data comprises analyzing collected image data in an attempt to determine a venue of the device.

19. The personal communication device of claim 13 further comprising:
    a transceiver;
    wherein the processor is further configured to transmit, via the transceiver, a result of the analyzing and to receive, via the transceiver, a visual message to display.

20. The personal communication device of claim 13 wherein choosing a visual message comprises applying rules to the analyzed data.

21. The personal communication device of claim 20 wherein applying rules comprises analyzing preferences of the user of the device or of a supplier of the displayed message.

* * * * *